(12) United States Patent
Becker

(10) Patent No.: US 11,526,560 B2
(45) Date of Patent: Dec. 13, 2022

(54) BACKWARDS-COMPATIBLE METHOD FOR RETRIEVING DATA STORED IN A DATABASE USING VERSIONED REFERENCE PERSPECTIVES OF EDGES

(71) Applicant: Stefan Becker, Gaildorf (DE)

(72) Inventor: Stefan Becker, Gaildorf (DE)

(73) Assignee: Stefan Becker, Gaildorf (DE)

( * ) Notice: Subject to any disclaimer, the term of this patent is extended or adjusted under 35 U.S.C. 154(b) by 27 days.

(21) Appl. No.: 16/249,541

(22) Filed: Jan. 16, 2019

(65) Prior Publication Data
US 2019/0228036 A1    Jul. 25, 2019

(30) Foreign Application Priority Data

Jan. 23, 2018 (EP) .................................... 18152888

(51) Int. Cl.
| | |
|---|---|
| *G06F 16/907* | (2019.01) |
| *G06F 16/2458* | (2019.01) |
| *G06F 16/21* | (2019.01) |
| *G06F 16/22* | (2019.01) |
| *G06F 16/25* | (2019.01) |

(52) U.S. Cl.
CPC .......... *G06F 16/907* (2019.01); *G06F 16/212* (2019.01); *G06F 16/213* (2019.01); *G06F 16/219* (2019.01); *G06F 16/22* (2019.01); *G06F 16/2474* (2019.01); *G06F 16/252* (2019.01)

(58) Field of Classification Search
CPC .. G06F 16/907; G06F 16/2474; G06F 16/213; G06F 16/22; G06F 16/219; G06F 16/252
See application file for complete search history.

(56) References Cited

U.S. PATENT DOCUMENTS

| | | | |
|---|---|---|---|
| 8,396,898 B2 | 3/2013 | Becker | |
| 8,674,993 B1 * | 3/2014 | Fleming | G06Q 40/06 345/440 |
| 10,268,776 B1 * | 4/2019 | Johnson | G06F 16/2358 |
| 10,467,201 B1 * | 11/2019 | Merritt | G06F 16/215 |

(Continued)

FOREIGN PATENT DOCUMENTS

WO    WO 2007/142346    12/2007

OTHER PUBLICATIONS

Udayan Khurana et al: "Efficient snapshot retrieval over historical graph data", Data Engineering (ICDE), 2013 IEEE 29th Internationale Conference On, IEEE, Apr. 8, 2013, pp. 997-1008, XP032430932, DOI: 10.1109/ICDE.2013.6544892, ISBN: 978-1-4673-4909-3.

*Primary Examiner* — Vincent F Boccio
*Assistant Examiner* — Zuheir A Mheir
(74) *Attorney, Agent, or Firm* — Wiggin and Dana LLP

(57) ABSTRACT

As typical databases evolve and the schema defining the stored data changes, difficulties arise in interfacing with the database and compatibility to applications may be lost. Provided for are methods for retrieving data stored in a database using versioned reference perspectives of edges, which define relationships between nodes. The methods provide for backwards-compatibility in accessing node-data stored in accordance with a pre-defined schema based upon a request including a version identifier. Also provided for are backend systems, frontend systems, and industrial machines for the manipulation of work products.

17 Claims, 3 Drawing Sheets

1. Version

2. Version

(56) References Cited

U.S. PATENT DOCUMENTS

| | | | |
|---|---|---|---|
| 2012/0197870 A1* | 8/2012 | Simon | G06F 16/24534 707/759 |
| 2014/0280302 A1* | 9/2014 | Morsi | G06F 16/24575 707/769 |
| 2015/0066524 A1* | 3/2015 | Fairbrothers | G16H 50/20 705/2 |
| 2016/0019228 A1* | 1/2016 | Hong | G06F 16/9024 707/624 |
| 2016/0292303 A1* | 10/2016 | Hong | G06F 16/9024 |
| 2017/0212945 A1* | 7/2017 | Shankar | G06F 16/2358 |
| 2017/0221240 A1* | 8/2017 | Stetson | G06F 16/904 |
| 2017/0364570 A1 | 12/2017 | Jacob et al. | |
| 2018/0075159 A1* | 3/2018 | Lin | G06F 16/9024 |
| 2018/0260442 A1* | 9/2018 | Vaidhyanathan | G06F 16/285 |
| 2018/0365336 A1* | 12/2018 | Raghavendra | H04L 43/026 |
| 2018/0367414 A1* | 12/2018 | Raghavendra | H04L 43/0817 |
| 2019/0121810 A1* | 4/2019 | Zhuang | G06F 16/2365 |
| 2019/0171736 A1* | 6/2019 | Lee | G06F 16/2365 |
| 2020/0175071 A1* | 6/2020 | Ogrinz | G06F 16/28 |
| 2021/0026894 A1* | 1/2021 | Yang | G06F 16/9024 |

\* cited by examiner

1. Version

2. Version

BACKWARDS-COMPATIBLE METHOD FOR RETRIEVING DATA STORED IN A DATABASE USING VERSIONED REFERENCE PERSPECTIVES OF EDGES

The present invention relates to a method for retrieving data stored in a database.

Databases are used in a wide variety of applications, wherein usually the data stored in the database is retrieved by using an interface to the database. Conventionally, databases only provide the possibility to persist data using a schema.

In case the schema according to which data are stored in the database has to be changed (to a "new" schema), compatibility to applications may be lost since applications accessing the database via the interface might expect the database to use the "old" schema. In order to be able to change the schema a translational layer has to be added to the database in order to allow a backwards compatibility. The translational layer is particularly necessary as databases usually use an abstract interface.

A disadvantage of adding such a translational layer is that, particularly for strongly interrelated data, the translational layer may be very complex.

It is therefore the object of the present invention to provide a method for retrieving data stored in a database which allows a reduced complexity of the database, particularly for strongly interrelated data, even in case the data stored in the database evolves.

This object is satisfied by a method having the features of claim 1.

Particularly, this object is satisfied by a method for retrieving data stored in a database, wherein
the data is stored in the database, the database comprising nodes and edges, wherein the nodes comprises node-data which is stored in accordance with a predefined schema and wherein the edges define relations between the nodes,
a combination of at least some of the edges is defined as a first version of a reference perspective,
updating at least one of the edges, yielding at least one updated edge, wherein a combination of edges which comprises at least one updated edge is defined as a second version of a reference perspective,
establishing a data connection to the database,
sending a request to retrieve data stored in the database, wherein the request comprises a version identifier which indicates the version of the reference perspective that is to be used for the request,
retrieving and outputting the requested data, wherein the data is retrieved based on the edges of the first version, if the version identifier indicates the first version and wherein the data is retrieved based on the edges of the second version, if the version identifier indicates the second version.

The invention is based on the finding that the classic approach of separating data from the interface has the above-described drawbacks. The invention therefore includes information about the relations of data stored in the database, i.e. information about the edges in the form of a version of the reference perspective in a request to retrieve data stored in the database (the request is equal to an interface). Thereby, changes in the data structure of the database can be performed with reduced effort, as will be explained below.

In the following details of the method of the invention are described.

According to the invention, the database comprises nodes and edges. The nodes can e.g. be tables, storing node-data. For example, one node may store the part-numbers of parts used in an industrial process, wherein another node may store data that represents the current location of the parts of the industrial process. The edges define relations between the nodes, e.g. an edge may be a pointer or link from a first node to a second node, wherein the edge may for example relate the part-number of the part in the industrial process to the location of the respective part. In general, the database is a relational database or a graph-database (as will be explained in more detail below).

Since the edges define relations between the nodes, the edges are part of the information/data stored in the database. Changing the edges can lead to a different meaning of the data in the database and can therefore lead to a different "view" of the data in the database. A combination of two or more of the edges is thus defined as a "reference perspective", wherein an initial combination of at least some of the edges is defined as a first version of the reference perspective. In principle, it is also possible that a version of the reference perspective is formed by one edge, only.

If at least one of the edges is updated, e.g. by changing the origin or the end of the pointer of the edge or by changing the name of the edge, an updated edge is created. A combination of edges which comprises at least one of the updated edges is then defined as a new (or "second") version of the reference perspective. An update of the edges can be necessary to allow additional or different data to be stored in the database. Also, the creation of new edges is considered as updating the edges. The database then comprises at least two different versions of the reference perspective.

Using a data connection to the database, requests to retrieve data stored in the database can be sent to the database. According to the invention, the requests comprise a version identifier which indicates the version of the reference perspective that is to be used for the respective request. In other words, the request specifies which version of the reference perspective should be used to retrieve the data stored in the database.

For the avoidance of doubt, it is clarified that herein usually only a first and a second version of the reference perspective are mentioned. However, it is to be understood that a large number of different versions of the reference perspective may be used, e.g. more than 2, more than 100 or more than 1000 different versions. The first version of the reference perspective is merely a representation of a former or initial version of the reference perspective, whereas the second version of the reference perspective indicates a later or higher version of the reference perspective. Thus, in general, updating at least one of the edges, yielding at least one updated edge, can yield a higher version of the reference perspective. When sending a request to retrieve data, a version identifier of the respective version is then included. When the request is responded, the outputted data is based on the respective version.

When the requested data is retrieved and outputted, the database then acts as if the version of the reference perspective as indicated by the version identifier is currently present in the database, although the database might internally already be using a higher version of the reference perspective.

To put it short, the invention allows an easy handling of different or upgraded data structures within a database as the interface of the database (i.e. the request) comprises a link to the data stored in the database. Due to integration of data into the interface, the effort for transforming the database when the stored data evolves, is greatly reduced.

It can be necessary to generalize data, i.e. the stored data evolves. To generalize the node-data of one node, a new node can be created that stores the generalized data of a formerly existing node. The formerly existing node is preferably not changed and the node-data of the formerly existing node is preferably not changed. After the new node has been created, the edges can be updated to form a new version of the reference perspective. As an example, a generalization of node-data can be present if a name is generalized by identification (ID)-data or if a part number is generalized by the product in which a certain part is comprised.

Preferably, the nodes and/or the edges comprise a nomenclature, wherein the nomenclature of the nodes and the nomenclature of the edges are part of a semantic expression. The semantic expression may be a part of the data stored in the database. In other words, the database may be a graph-database. The nomenclature can be the name of the respective node or edge. The semantic expression preferably can have the basic structure

[name of first node] is [name of edge] of/to [name of second node].

For example, a first node may be named "part position", whereas a second node may be named "part number". These two nodes may be connected by an edge named "location". This would lead to the semantic expression "part position is location of part number", thus allowing to retrieve the current position of a specific part using its part number.

Further preferably, all edges within the database form the reference perspective. In other words, even a change of one edge will result in a new version of the reference perspective.

For example, initially two nodes may exist. A first node stores data of names (e.g. of persons). A second node stores data about addresses (of these persons). The first and second node are connected via an edge that is named "home". The first and second node and the edge thus form a semantic expression that reads "address is home of name". In case the data stored in the database is generalized, a second version of the reference perspective is formed. The second version is generalized to be able to store not only names but identification (ID)-information in general. For this purpose a third or new node is created which stores the ID-information. The "home" edge is then updated to now connect the third node and the second node. In addition a further edge is created which is named "human name" and which connects the third node and the first node. The first and third node and the newly created edge thus form a semantic expression that reads "name is human name of ID". The database is thus able to also store information of addresses not only of humans but also of anything having an identification.

For example, the request could comprise the following code:

get (Vx) all address with home of name;

In the above request, "Vx" represents the version of the reference perspective that should be used. In the request all addresses of a specific name are requested. It can be seen that the above code (which represents a request or interface) can always be used, independent of the current status of the database and independent of the highest version of the reference perspective of the database. This allows that clients using the database do not have to be updated or upgraded every time the database is updated. Thereby, the effort required to provide a working system of clients and a database is greatly reduced.

Advantageously, a backwards compatibility logic is used upon a request in which the version identifier indicates the first version, wherein the backwards compatibility logic preferably comprises transformation instructions that are automatically executed in order to retrieve the requested data. The backwards compatibility logic may for example temporarily reset all edges to the state of the first version of the reference perspective or the backwards compatibility logic may e.g. build a redundant perspective. The database can then retrieve the requested data. After the requested data is retrieved and outputted, the edges can be changed to the second version of the reference perspective, again, or the temporary structure of the edges can be deleted. During this procedure, the node-data is preferably unchanged. It is also possible to store versioned dependencies between different versions of the reference perspective, which allow emulating a former version of the reference perspective.

Advantageously, the predefined schema is centrally specified and preferably static. This means that one central "authority" exists within the database in which the predefined schema is specified. The predefined schema may for example comprise the nomenclature of all nodes. Preferably, the schema may also comprise more detailed information about the node-data, e.g. a name for each column of tables stored in the node-data. Due to the centrally specified schema, inconsistencies within the database are prevented. If the predefined schema is static, even inconsistencies that can occur over longer periods of time of usage of the database can also be prevented.

Preferably, different nodes are stored on a plurality of physically separated servers. In other words, the stored nodes can be distributed over separate servers. For example, a first node may be stored on a first server, whereas a second node can be stored on a physically separated second server. All servers may be connected using data connections, e.g. Ethernet connections. Since the predefined schema is preferably centrally specified, all servers may access the centrally specified schema to ensure a correct storage of the nodes. Each server may only store the respective edges that are relevant for the nodes stored on the respective server.

It is preferred if all servers are synchronized to use the highest version of the reference perspective. Such a synchronization allows an easy distribution of big data volumes over separate servers, as the centrally specified schema is identical for every server and requests for data can therefore be handled without the need to mirror large data quantities.

Preferably, the edges are described in a specification in order to form one of the versions of the reference perspective, wherein the specification preferably also comprises a second specification describing the edges of a lower (e.g. of the first) version of the reference perspective. The specification can also be centrally stored, particularly on a central server of the database. This central server can also store the predefined schema. The specification can furthermore comprise transformation instructions for the backwards compatibility of the reference perspective. In other words, the first version of the reference perspective can be seen as a sub-graph as compared to the second version of the reference perspective. The specification may contain a versioned sub-graph and/or a dependency to another specification. Within the specification, the edges of a specific version of the reference perspective can be stored in an edge specification (ES).

Due to the centrally stored specification, it is possible to distribute stored data over different servers. It is therefore an advantage that large quantities of data can be easily distributed over several servers and can even be stored in different geographic locations. Therefore, the need for powerful servers, on which complete copies of the database are hosted, is omitted. Thus, the database can either be hosted on relatively inexpensive equipment or can provide an increased speed and/or technical performance.

As indicated above, the nodes may store the node-data at least partially in named tables having a plurality of named columns. Particularly, the specification can comprise a table specification (TS) for each table. The TS is not versioned (i.e. static over different versions of the reference perspective) and comprises the name of the table. Within the TS a field specification (FS) can be provided. The FS is not versioned (i.e. static over different versions of the reference perspective) and comprises the names of e.g. columns of the table.

Similarly to retrieving data from the database, a request to store data in the database can also comprise the version identifier. The method can thus comprise the steps of sending a request for storing data to the database, wherein the request comprises a version identifier indicating the first or second version of the reference perspective, wherein the data to be stored is then stored using the version of the reference perspective that is indicated by the version identifier.

The invention also relates to a backend system preferably comprising at least two separate servers, the backend system being adapted to store data in a database, the database comprising nodes and edges, wherein the nodes comprise node-data which is stored in accordance with a predefined schema and wherein the edges define relations between the nodes, define a combination of at least some of the edges as a first version of a reference perspective, update at least one of the edges, yielding at least one updated edge, wherein a combination of edges which comprises at least one updated edge is defined as a second version of a reference perspective, receive a request to retrieve data stored in the database, wherein the request comprises a version identifier which indicates the version of the reference perspective that is to be used for the request, retrieve and output the requested data, wherein the data is retrieved based on the edges of the first version, if the version identifier indicates the first version and wherein the data is retrieved based on the edges of the second version, if the version identifier indicates the second version.

Particularly, one of the servers of the backend system may be the central server that stores the centrally specified schema and/or the specification.

The invention also relates to a frontend system comprising at least two separate clients, each client being adapted to establish a data connection with a backend system as described above, send a request to the backend system to retrieve data stored in a database, wherein the request comprises a version identifier which indicates the version of a reference perspective that is to be used for the request, wherein the separate clients use at least two different version identifiers.

A client can e.g. be a micro-service, i.e. a computer, a mobile phone or a field device.

The invention further relates to a system comprising a backend system and a frontend system as described above.

Finally, the invention also relates to an industrial machine for the manipulation of a work product, the machine comprising at least two separate clients, for example sensors and actors, and at least one backend system as described above, wherein the clients comprise a data connection with the backend system, wherein the clients are adapted to send a request to the backend system to retrieve data stored in the database, wherein the request comprises a version identifier which indicates the version of a reference perspective that is to be used for the request, wherein the separate clients use at least two different version identifiers, and wherein the data retrieved from the database is used to alter the manipulation of the work product. The industrial machine may e.g. be a production line for an industrially produced product (i.e. the work product). During the manipulation of the work product, information from the database can be required. This data is retrieved by the at least two separate clients. As an advantage, the clients use two different version identifiers and nonetheless may easily retrieve the requested data from the database. Consequently, the clients do not have to be upgraded or updated every time the reference perspective of the database is changed. Thus, the clients of the industrial machine can be used over long periods of time without requiring an update or upgrade.

The advantages, preferable features and/or embodiments of the inventive method described in the foregoing also apply to the inventive backend system, the inventive frontend system, the inventive system and the inventive industrial machine.

The invention will be explained in the following in detail by means of exemplary embodiments and with reference to the Figures.

Figure 1:
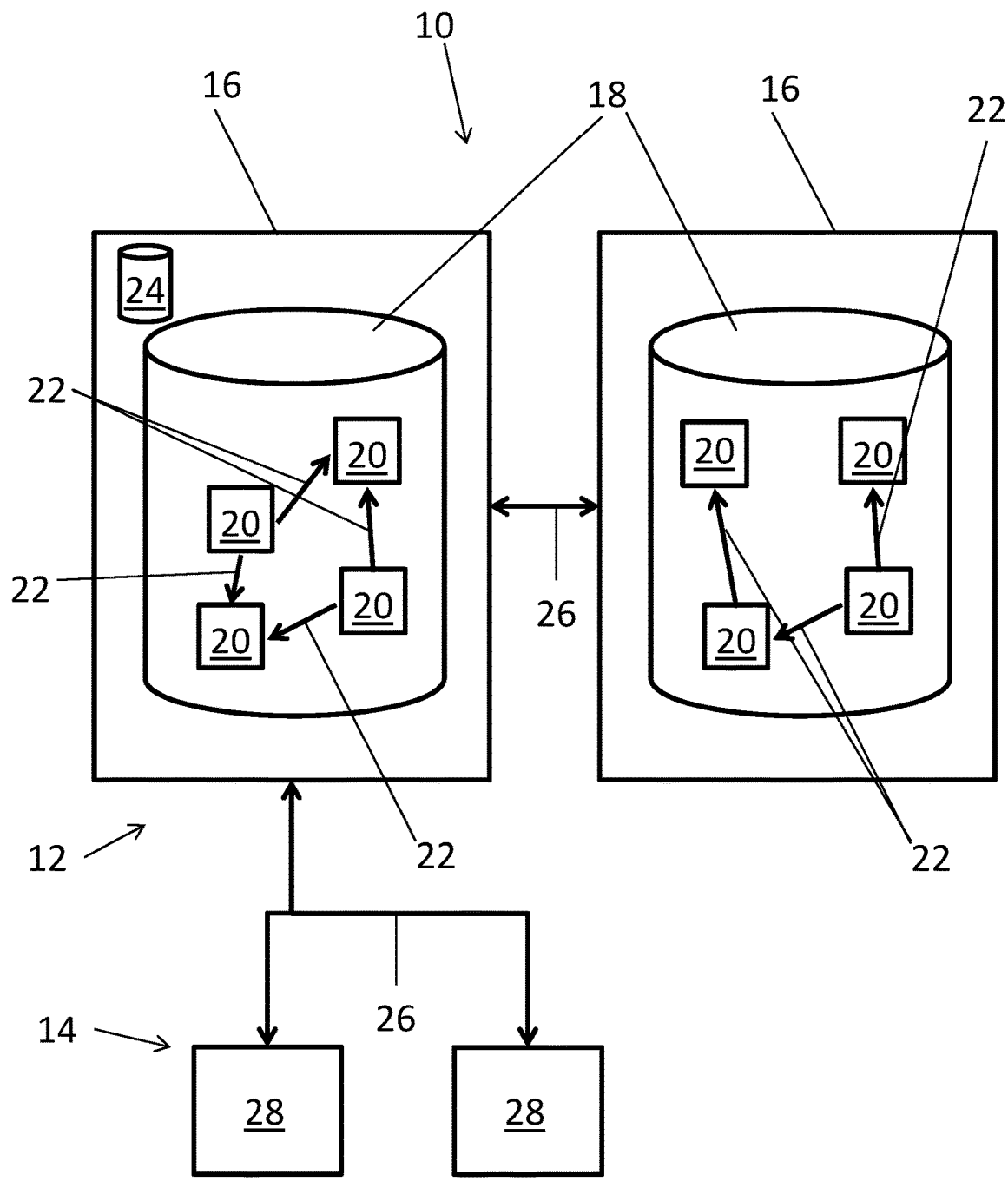
FIG. 1 shows a schematic view of a system comprising a backend and a frontend.

FIG. 1 shows a system 10 comprising a backend 12 and a frontend 14. The backend 12 comprises two servers 16. Both servers 16 store a part of a common database 18.

The database 18 includes nodes 20 and named edges 22, wherein the nodes 20 each comprise a named table having named columns (not shown). The edges 22 define relations between the nodes 20.

Only one of the servers 16 comprises a central storage 24 which stores a predefined schema according to which the nodes 20 store their node-data. The central storage also stores a specification describing different versions of the edges 22. A combination of the edges 22 of one version is termed a "reference perspective". The central storage 24 thus stores information about different versions (i.e. at least a first and a second version) of the reference perspective. It is possible that all other servers 16 comprise a copy of the central storage 24 which is synchronized regularly.

The two servers 16 are connected with each other via a data connection 26.

The frontend 14 comprises two clients 28 in the form of field devices. The clients 28 are connected to the backend 12 via data connections 26.

When one of the clients 28 requires data from the database 18, the respective client 28 uses the data connection 26 to send a request to the backend 12 to retrieve data stored in a database 18, wherein the request comprises a version identifier which indicates the version of a reference perspective that is to be used for the request.

The backend 12 then retrieves the requested data, wherein the data is retrieved based on the edges of the version that is indicated by the version identifier of the request. The retrieved data is then outputted to the requesting client 28 (via the data connection 26).

The two different clients 28 use two different version identifiers (e.g. for a first version and a second version). This has the advantage that also older clients 28 (i.e. the client 28 which uses the first version) can simultaneously be used with newer clients 28 without updating the older client 28.

Figure 2:
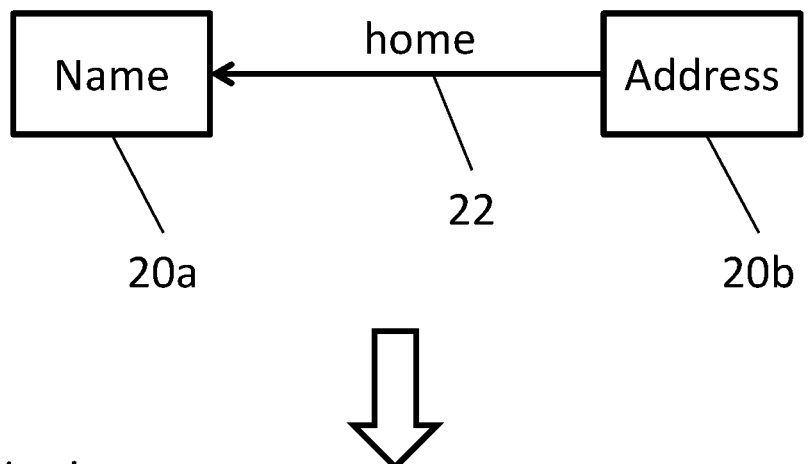
FIG. 2 shows a transition from a first version of a reference perspective to a second version of the reference perspective.
Figure 2:
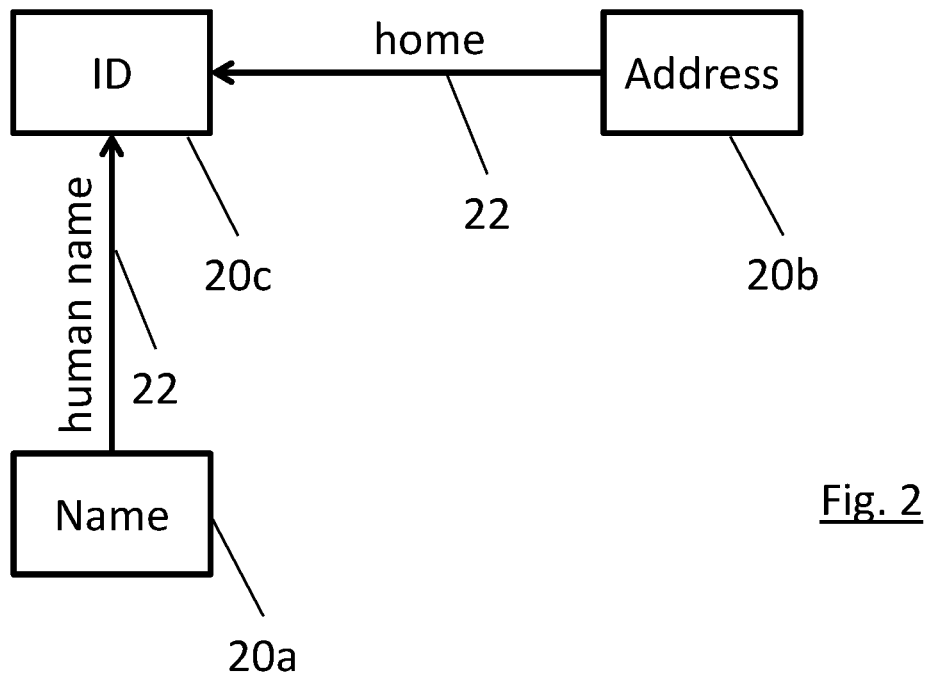

FIG. 2 shows the transition from a first version of a reference perspective to a second version of the reference perspective. In the first version, two nodes 20 exist. A first node 20a stores data about names (e.g. of persons). A second node 20b stores data about addresses (of these persons). The first and second node 20a, 20b are connected via an edge 22 that is named "home". The first and second node 20a, 20b and the edge 22 thus form a semantic expression that reads "address is home of name".

In case the data stored in the database 18 should be generalized, a second version of the reference perspective can be formed, as is shown in FIG. 2. For the second version the data stored in the node 20a is to be generalized such that not only names can be stored but identification (ID)-information in general. For this purpose a third node 20c is created which stores the ID-information. The "home" edge 22 is then updated to connect the third node 20c and the second node 20b. In addition a further edge 22 is created which is named "human name" and which connects the third node 20c and the first node 20a. The first and third node 20a, 20c and the newly created edge 22 thus form a semantic expression that reads "name is human name of ID". The database 18 is now able to also store information of addresses not only of humans but also of anything having an identification.

In the central storage 24, the second version of the reference perspective is then stored. All servers 16 are then synchronized to use the second version of the reference perspective as standard.

The central storage 24 also comprises a backwards compatibility logic having transformation instructions. These transformation instructions (in the example of FIG. 2) can comprise instructions to ignore the third node 20c and information that the "home" edge 22 connects the first and second nodes 20a, 20b. The transformation instructions are temporarily applied when a request including a version identifier indicating the first version of the reference perspective is received in order to process the request.

Figure 3:
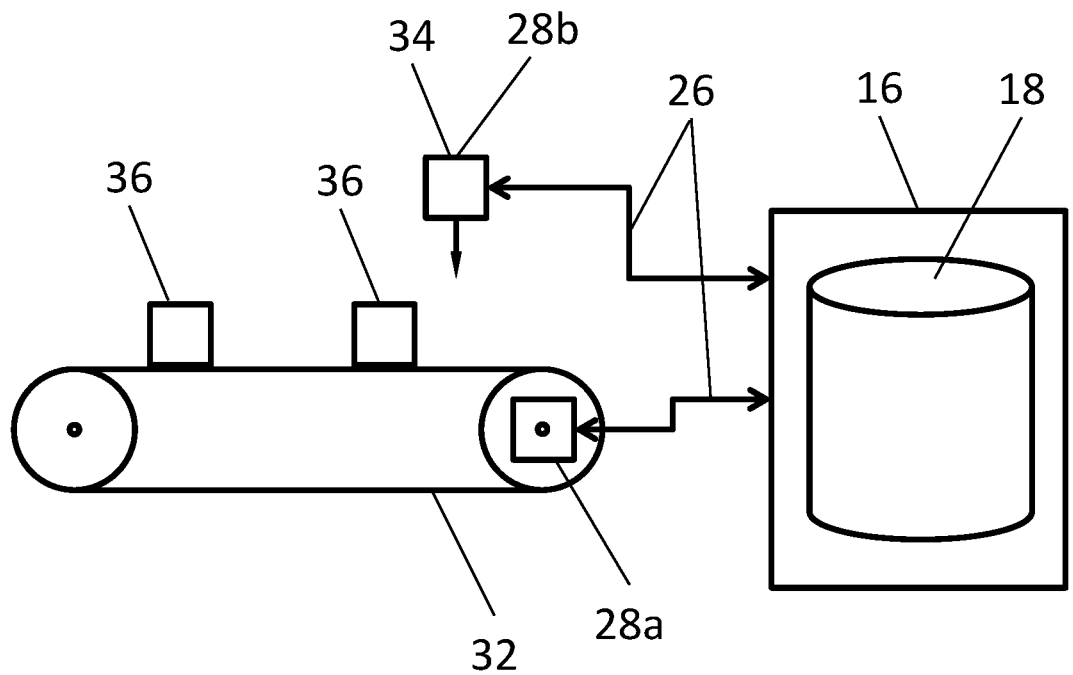
FIG. 3 shows an industrial machine which is connected to a backend system.

FIG. 3 shows an industrial machine 30 having a transport belt 32 and a drill 34. The industrial machine 30 is used to drill holes in work products 36 which are transported on the transport belt 32. The transport belt 32 is operated by a first client 28a, whereas the drill 34 is operated by a second client 28b. The clients 28a, 28b are connected to a backend 12 in order to retrieve data on how specific work products 36 have to be handled.

The first client 28a uses a version identifier indicating the first version of the reference perspective. In contrast, the second client 28a uses a version identifier indicating the second version of the reference perspective. The effort required to maintain the functionality of the industrial machine 30 is kept at a minimum, as both, the first and second client 28a, 28b can retrieve data from the backend 12 due to the use of the different versions of the reference perspective. A time-consuming and costly update of the first client 28a can therefore be omitted.

Figure 4:
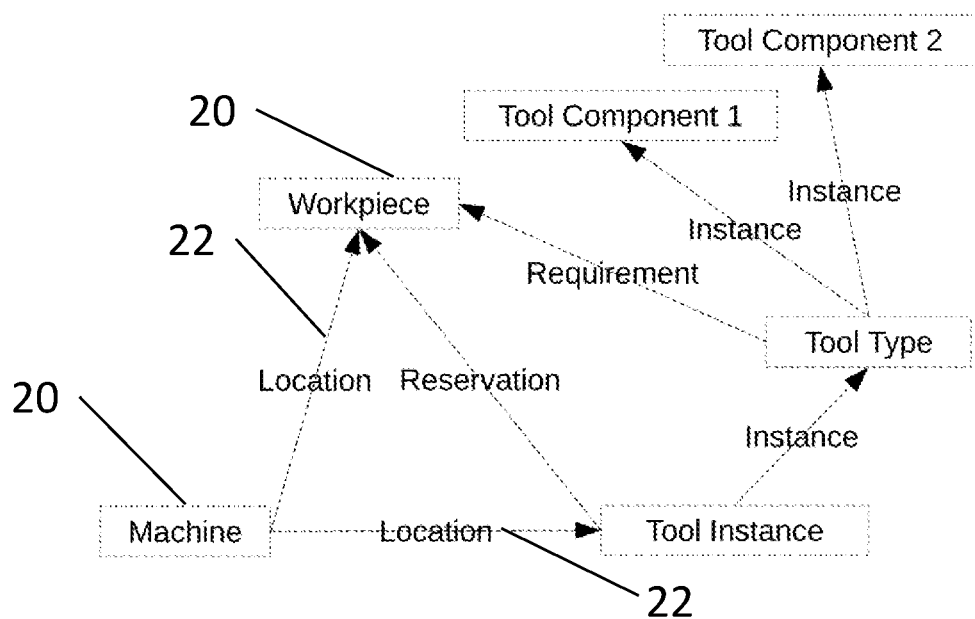
FIG. 4 shows an exemplary database comprising nodes and edges.

FIG. 4 shows an exemplary database 18 which comprises nodes 20 and edges 22. The database 18 as shown in FIG. 4 could be used for the industrial machine 30 (i.e. in the backend 12 of FIG. 3). The database 18 e.g. stores information about the tools of the industrial machine 30 and about the locations where specific tools are used. As an example, one semantic expression that is used in the database 18 is given in the following: "Machine is Location of Tool Instance".

| List of reference numerals: | |
|---|---|
| 10 | system |
| 12 | backend |
| 14 | frontend |
| 16 | server |
| 18 | database |
| 20, 20a, 20b, 20c | node |
| 22 | edge |
| 24 | central storage |
| 26 | data connection |
| 28, 28a, 28b | client |
| 30 | industrial machine |
| 32 | transport belt |
| 34 | drill |
| 36 | work product |

The invention claimed is:

1. A method for retrieving data stored in a database, comprising:
    establishing a data connection to the database, wherein the database stores a plurality of nodes as node-data in accordance with a predefined scheme and a plurality of edges defining relations between the nodes, wherein a first combination of edges defines a first version of a reference perspective, and a second combination of edges having at least one updated edge defines a second higher version of the reference perspective, and wherein the database has a version corresponding to the highest version of the reference perspective;
    sending a request to retrieve data stored in the database, wherein the request is executable by the database to retrieve the requested data without a translational layer and includes a version identifier indicating the version of the reference perspective to be used for the request;
    comparing the version identifier indicated in the request to the database version and temporarily instating the first version of the reference perspective in the database if the request indicates the first version, whereby the database is backwards-compatible toward requests including a version identifier indicating a version lower than that of the database and wherein the node-data is unchanged by temporarily instating the first version of the reference perspective in the database; and
    retrieving and outputting the requested data, wherein the data retrieved is based on the edges of the indicated version of the reference perspective.

2. The method of claim 1, wherein the nodes and the edges comprise a nomenclature, wherein the nomenclature of the nodes and the nomenclature of the edges are part of a semantic expression.

3. The method of claim 1, wherein all edges within the database form the reference perspective.

4. The method of claim 1, wherein a backwards compatibility logic is used upon a request in which the version identifier indicates the first version.

5. The method of claim 4, wherein the backwards compatibility logic comprises transformation instructions that are automatically executed in order to retrieve the requested data.

6. The method of claim 1, wherein the predefined scheme is centrally specified.

7. The method of claim 6, wherein the predefined scheme is static.

8. The method of claim 1, wherein different nodes are stored on a plurality of physically separated servers.

9. The method of claim 8, wherein all servers are synchronized to use a highest version of the reference perspective.

10. The method of claim 1, wherein the edges are described in a specification in order to form one of the versions of the reference perspective.

11. The method of claim 10, wherein the specification also comprises a second specification describing the edges of the first version of the reference perspective.

12. The method of claim 1, wherein the nodes store the node-data at least partially in named tables having a plurality of named columns.

13. A backend system comprising:
one or more servers hosting a database having nodes and edges, wherein the nodes comprise node-data which is stored in accordance with a predefined scheme, and wherein the edges define relations between the nodes;
wherein the database defines a first combination of edges as a first version of a reference perspective;
wherein the database defines a second combination of edges having at least one updated edge as a second higher version of the reference perspective, and wherein the database has a version corresponding to the highest version of the reference perspective;
wherein the database receives a request to retrieve data stored in the database, and wherein the request is executable by the database to retrieve the requested data without a translational layer and includes a version identifier indicating the version of the reference perspective to be used for the request;
wherein the database compares the version identifier indicated in the request to the database version and temporarily instates the first version of the reference perspective in the database if the request indicates the first version, whereby the database is backwards-compatible toward requests including a version identifier indicating a version lower than that of the database, and wherein the node-data is unchanged by temporarily instating the first version of the reference perspective in the database; and
wherein the data requested from the database is retrieved from the one or more servers based on the edges of the indicated version of the reference perspective.

14. The backend system of claim 13, further comprising at least two separate servers.

15. The backend system of claim 13, wherein the backend system is connected to a frontend system,
wherein the frontend system includes at least two separate clients, each client having a data connection establishable with the backend system,
wherein one or more requests to retrieve data stored in the database sent from each client to the backend system include a version identifier which indicates the version of the reference perspective that is to be used for the one or more requests, and
wherein the separate clients use at least two different version identifiers.

16. A frontend system comprising at least two separate clients, each client having:
a data connection establishable with a backend system, the backend system having:
one or more servers hosting a database having nodes and edges, wherein the nodes comprise node-data which is stored in accordance with a predefined scheme, and wherein the edges define relations between the nodes;
wherein the database defines a first combination of edges as a first version of a reference perspective;
wherein the database defines a second combination of edges having at least one updated edge as a second higher version of the reference perspective, and wherein the database has a version corresponding to the highest version of the reference perspective;
wherein the database receives a request to retrieve data stored in the database, and wherein the request is executable by the database to retrieve the requested data without a translational layer and includes a version identifier indicating the version of the reference perspective to be used for the request;
wherein the database compares the version identifier indicated in the request to the database version and temporarily instates the first version of the reference perspective in the database if the request indicates the first version, whereby the database is backwards-compatible toward requests including a version identifier indicating a version lower than that of the database, and wherein the node-data is unchanged by temporarily instating the first version of the reference perspective in the database; and
wherein the data requested from the database is retrieved from the one or more servers based on the edges of the indicated version of the reference perspective.

17. An industrial machine for the manipulation of a work product, the machine comprising at least two separate clients, for example sensors and actors, and at least one backend system having
one or more servers hosting a database having nodes and edges, wherein the nodes comprise node-data which is stored in accordance with a predefined scheme, and wherein the edges define relations between the nodes;
wherein the database defines a first combination of edges as a first version of a reference perspective;
wherein the database defines a second combination of edges having at least one updated edge as a second higher version of the reference perspective, and wherein the database has a version corresponding to the highest version of the reference perspective;
wherein the database receives a request to retrieve data stored in the database, and wherein the request is executable by the database to retrieve the requested data without a translational layer and includes a version identifier indicating the version of the reference perspective to be used for the request;
wherein the database compares the version identifier indicated in the request to the database version and temporarily instates the first version of the reference perspective in the database if the request indicates the first version, whereby the database is backwards-compatible toward requests including a version identifier indicating a version lower than that of the database, and wherein the node-data is unchanged by temporarily instating the first version of the reference perspective in the database; and wherein the data requested from the database is retrieved from the one or more servers based on the edges of the indicated version of the reference perspective.

\* \* \* \* \*